Figure 1:
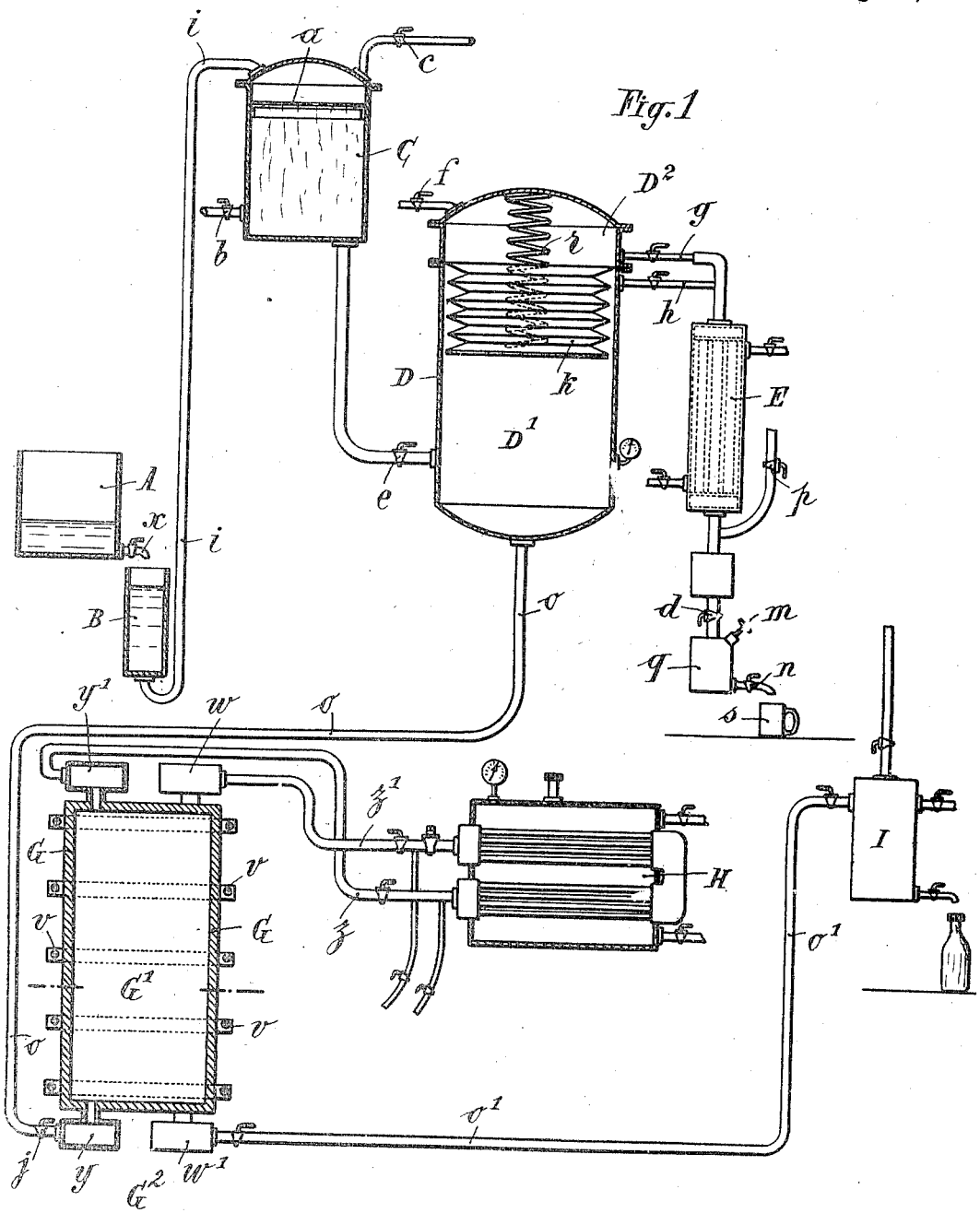

UNITED STATES PATENT OFFICE.

JOSEPH DESMAROUX, OF PARIS, FRANCE.

PROCESS AND APPARATUS FOR STERILIZING MILK AND OTHER ORGANIC LIQUIDS.

1,036,806.  Specification of Letters Patent.  Patented Aug. 27, 1912.

Application filed March 26, 1908. Serial No. 423,470.

*To all whom it may concern:*

Be it known that I, JOSEPH DESMAROUX, a citizen of the Republic of France, residing in Paris, France, have invented a certain new and useful Process and Apparatus for Sterilizing Milk and other Organic Liquids, of which the following is a specification.

The present invention aims to sterilize milk and other organic liquids in such a way as to completely free them from pathogenic or other germs, without altering the taste, color, appearance and properties of the liquid.

The process in its most specific form includes the following three successive operations:—

1. The milk is finely subdivided and brought into the presence of an active gas, such as oxygen or ozonized air, which comes in contact with all the particles of the subdivided milk, thus preparing for the final sterilization of the milk and rendering it much easier. By this operation the milk becomes very sensitive and very permeable by the heat, which is the final agent employed in the sterilization.

2. The milk thus prepared is then freed from the gas remaining in it, not only from the active gas employed in the first operation, but also of any other gas which may have been previously in solution in the milk. This withdrawal of the gases takes place at a temperature about 15° to 30° C., under the action of a vacuum, the pressure being reduced to about 10 millimeters of mercury. This operation is continued to the point where a small quantity of the liquid is removed by distillation or evaporation so as to show that the milk has been freed of all gases and volatile products which were in it. It is also important that the milk to be sterilized by heat in the third step of the operation explained below, shall contain no trace of gas which might under the action of heat seriously modify the taste and chemical constitution of the milk.

3. The milk prepared as above explained is then sterilized by heating. The heating takes place while the milk is maintained out of contact with any air or gas whatever. Nevertheless the circulation of the milk in the heating apparatus is effected by exerting upon one side of the body of milk a pressure of at least one kilogram per square centimeter, and by producing on the other side of the body such a vacuum as to effect the flow of the milk by reason of the difference of pressure. But the fluid pressure transmitted to the milk in the direction of its movement, is exerted through the intermediation of a membrane which follows the surface of the milk introduced into a suitable reservoir; so that the compressed fluid, gaseous or otherwise, cannot mix with the milk and become dissolved therein. Under these conditions the temperature may be raised to 110° to 120° C., which is necessary to obtain a complete sterilization.

This process of sterilization of milk (or of other organic liquids) is specifically distinguished therefore from known processes, in that the milk is heated to a temperature of 110° to 120° C., under the action of a pressure of about one kilogram per square centimeter produced by a fluid which is not in contact with the milk under treatment, the milk having been, before heating, brought to as fine a state of division as practicable, and submitted to the action of an active gas to prepare it for the sterilization, and the operation of sterilization being effected however on milk absolutely free from any gas whatever, because such gases have been removed to the point where distillation commences in a vacuum, but distillation being stopped only when a little of the liquid is vaporized and condensed.

The following description, with reference to the annexed drawing, will explain the means of realizing the process above described.

Figure 2:
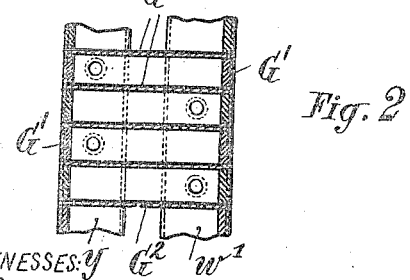

Figure 1 is a schematic view of the complete apparatus; Fig. 2 is a section of the vessel G at right angles to the section thereof shown in Fig. 1.

The milk is subjected to the first operation, the treatment in a fine state of division, by an active gas in the elevated receptacle C, which carries near its upper end a perforated disk $a$ upon which the milk to be treated is admitted by a tube $i$ under the action of a vacuum which is produced through a tube with a valve $c$. The tube $i$ connects at its lower end with a measuring receptacle B, which is filled with milk from a receptacle A having a cock $x$. The milk drawn through the tube $i$ spreads over the surface of the disk $a$ and falls in fine drops through the perforations of this disk into the space below. While the milk is falling thus in a state of perfect division through the receptacle C, it is subjected to the action of an active gas, oxygen or ozonized air, which is admitted through a tube having a cock $b$. The milk then runs by way of a tube provided with a cock $e$ to the receptacle D.

It is in the receptacle D that the milk is freed from gas. It is also in this receptacle that a pressure is exerted on the surface of the liquid to effect its circulation in the apparatus for sterilizing by heat. The receptacle D has within it a flexible extensible membrane $k$ of accordion type, the edge of the upper rim being fixed to the inner wall of the receptacle D. A coiled spring $r$ is fixed at one end at the center of the said membrane, and at the other end to the upper end of the receptacle D. A tube having a cock $f$ serves for the admission of a fluid under pressure. Two conduits $g$ $h$ which communicate with each other, and which communicate respectively with the two chambers $D^2$ and $D'$, which are separated by the flexible membrane, serve to equilibrate the pressure of these two chambers. These two conduits $g$ $h$ communicate with a condensation apparatus E.

From the bottom of the receptacle D a tube $o$ runs out, through which the milk is passed to conduct it successively to the sterilization apparatus and to the withdrawal apparatus I.

The removal of the gas carried in the milk contained in the receptacle D, is effected by means of a vacuum produced in the bottom of the condensation apparatus E through a tube having a valve $p$ therein, at a low temperature (15° to 30° C.), and the operation is pushed so far that there is condensed in the apparatus E a little of the liquid, showing the vaporization of the milk contained in D. The condenser is of the ordinary tubular type, the gas being condensed in the tubes by a cooling liquid circulating about the tubes. This assures certainly that there shall no longer remain in the milk any gas or volatile particles. The products of distillation which condenses in the apparatus E are collected in the following way:—The condenser E communicates at its lower end through a conduit provided with a valve $d$ with a small reservoir $q$ provided with a needle valve $m$ and with a draw-off cock $n$. The liquid being collected in $q$ after the opening of the valve $d$, the valve $d$ is then closed and $m$ and $n$ are then opened and the condensed liquid runs out into a vessel $s$. When this takes place the valve $j$ in the lower end of the tube $o$ is opened and fluid pressure is exerted by opening the valve $f$ leading into the receptacle D. Thus the milk is made to circulate in the apparatus for sterilizing by heat. The membrane $k$, of rubber or other suitable material, is pressed downward in the receptacle D, remaining in contact with the liquid, so that the latter finds itself submitted on one side to the pressure necessary to produce the circulation of the liquid during heating, without being able to produce any phenomenon of ebullition. This renders the operation absolutely harmless, so that there is no alteration of the milk or modification of its chemical composition. When the membrane $k$, which serves to isolate the milk from the compressed fluid by which it is circulated, reaches the bottom of the receptacle D and expels practically all of the milk under constant pressure, the compressing fluid is stopped and withdrawn, the spring $r$ again lifts the membrane $k$, and the receptacle D can receive a new charge of liquid.

The sterilization apparatus may be of any known or suitable type. In the drawing it is supposed to be composed of a heater H and a temperature interchanging apparatus G. The latter is composed substantially of vertical boxes formed of frames $G'$ separated by plates $G^2$, the whole held together by ties $v$. The boxes $G'$ $G^2$ formed by the frames of the plates, communicate in pairs through small tubes with the outer boxes $y$ $y'$ at top and bottom, so that there is a circulation of the colder milk in one direction and the warmer milk in the opposite direction, with only thin walls between the two streams, so as to permit an interchange of heat between the two streams. The lower one of the outer boxes, $y$, is connected to the receptacle D, and the upper one, $y'$, communicates through the tube $z$ with the heater H. The milk is thus circulated through the boxes $y$ and $y'$ going to the heater. The milk passing out of the heater passes through a tube $z'$, a box $w$, and the alternative passages in the interchanger $G'$ to the box $w'$, and thence through the tube $o'$ to the bottling apparatus. The two streams passing through the interchanger $G'$ with only the plates $G^2$ between them, partly exchange their temperatures, so that the incoming milk is warmed and the outgoing milk cooled.

The heater H is composed of tubes in two groups connected respectively to the tubes $z$ and $z'$, and each group communicating with the other at the opposite end of the heater, so as to provide for circulating the milk and heating the same, the heating tubes being in a closed receptacle for hot water or other heating medium. After sterilization and cooling in the interchanger G, the milk passes to the bottling apparatus I.

What I claim is:—

1. The sub-process in the sterilizing of an organic liquid, which consists in first treating it with an active gas and then removing all volatile matter held in solution in such liquid by means of a vacuum and at a low temperature, carrying the operation to the point of vaporization of a small quantity of the liquid.

2. An apparatus for use in sterilizing an organic liquid, comprising means for finely dividing the liquid and subjecting it to an active gas, means for subjecting the liquid to a vacuum at a low temperature to remove all volatile matter held in solution, and means for finally heating it to between 110 and 120 degrees centigrade.

3. An apparatus for sterilizing an organic liquid comprising means for finely dividing the same, and means for subjecting it in such finely divided state to an active gas, in combination with means for subjecting the liquid to a vacuum at a low temperature to volatilize all matter held in solution therein.

4. An apparatus for sterilizing an organic liquid comprising means for finely dividing the same, and means for subjecting it in such finely divided state to an active gas, in combination with means for subjecting the liquid to a vacuum at a low temperature to volatilize all matter held in solution therein, and means for subjecting it to fluid pressure without contact with the pressure medium and heating it to between 110 and 120 degrees centigrade.

In witness whereof, I have hereunto signed my name in the presence of two subscribing witnesses.

JOSEPH DESMAROUX.

Witnesses:
   H. C. COXE,
   GABRIEL BELLIARD.